US008645457B2

(12) United States Patent
Foster et al.

(10) Patent No.: US 8,645,457 B2
(45) Date of Patent: Feb. 4, 2014

(54) SYSTEM AND METHOD FOR NETWORK OBJECT CREATION AND IMPROVED SEARCH RESULT REPORTING

(75) Inventors: Dayton Foster, Calgary (CA); Derek Ball, Calgary (CA); R. Allan MacKenzie, Calgary (CA)

(73) Assignee: Tynt Multimedia Inc., New York, NY (US)

( * ) Notice: Subject to any disclaimer, the term of this patent is extended or adjusted under 35 U.S.C. 154(b) by 467 days.

(21) Appl. No.: 12/830,433

(22) Filed: Jul. 5, 2010

(65) Prior Publication Data

US 2011/0082898 A1 Apr. 7, 2011

Related U.S. Application Data

(60) Provisional application No. 61/272,685, filed on Oct. 21, 2009, provisional application No. 61/272,550, filed on Oct. 5, 2009, provisional application No. 61/272,972, filed on Nov. 27, 2009, provisional application No. 61/288,804, filed on Dec. 21, 2009, provisional application No. 61/342,870, filed on Apr. 19, 2010, provisional application No. 61/282,942, filed on Apr. 27, 2010, provisional application No. 61/344,028, filed on May 10, 2010.

(51) Int. Cl.
*G06F 15/16* (2006.01)
*G06F 7/00* (2006.01)

(52) U.S. Cl.
USPC .......................................... 709/202; 707/723

(58) Field of Classification Search
USPC .......... 709/217–219, 201–203; 707/706–712, 707/722–735
See application file for complete search history.

(56) References Cited

U.S. PATENT DOCUMENTS

| 5,848,410 | A   | * | 12/1998 | Walls et al. ........................... 1/1 |
| 6,341,306 | B1  |   | 1/2002  | Rosenschein et al. |
| 6,785,670 | B1  |   | 8/2004  | Chiang et al. |
| 6,931,397 | B1  | * | 8/2005  | Sundaresan ................... 707/707 |
| 7,308,439 | B2  |   | 12/2007 | Baird et al. |
| 7,590,949 | B2  |   | 9/2009  | Yuzawa et al. |
| 7,797,301 | B1  |   | 9/2010  | Baird et al. |
| 7,983,963 | B2  | * | 7/2011  | Byrne et al. ................. 705/27.2 |
| 2005/0086219 | A1 |   | 4/2005  | Martin |
| 2006/0085397 | A1 | * | 4/2006  | D'Urso ............................. 707/3 |
| 2006/0123014 | A1 | * | 6/2006  | Ng ................................ 707/100 |

(Continued)

OTHER PUBLICATIONS

Shen et al., "Implicit User Modeling for Personalized Search", CIKM'05, Oct. 31-Nov. 5, 2005, pp. 824-831. Bremen, Germany.

*Primary Examiner* — Brendan Higa
(74) *Attorney, Agent, or Firm* — Patent Law Works LLP

(57) ABSTRACT

Systems and methods are described that may be used for the creation of user defined objects arising from the implicit interaction of a user with a network resource. The objects are made generally available within the network. A network resource in communication with a network maintains content accessible by a plurality of users of the network. An agent provided to a user device identifies an implicit interaction with a portion of the content and transmits information associated with the implicit interaction to another computing system communicatively connected to the network. The information includes a URL identifying the network resource and the portion of the content and is provided in a user-defined object on the network. Frequency of occurrence of a URL in a plurality of the objects can be used to determine relevance of a network resource and its content.

16 Claims, 4 Drawing Sheets

(56) References Cited

U.S. PATENT DOCUMENTS

| | | |
|---|---|---|
| 2006/0230058 A1 | 10/2006 | Morris |
| 2007/0112761 A1* | 5/2007 | Xu et al. ............................ 707/5 |
| 2007/0233692 A1 | 10/2007 | Lisa et al. |
| 2007/0271255 A1 | 11/2007 | Pappo |
| 2008/0005108 A1* | 1/2008 | Ozzie et al. ...................... 707/7 |
| 2008/0027707 A1 | 1/2008 | Stefik et al. |
| 2008/0154887 A1* | 6/2008 | Ryan et al. ....................... 707/5 |
| 2009/0171907 A1 | 7/2009 | Radovanovic |
| 2009/0172514 A1 | 7/2009 | Radovanovic |
| 2009/0271388 A1 | 10/2009 | Murdock et al. |
| 2009/0276408 A1 | 11/2009 | Auerbach et al. |
| 2009/0282023 A1* | 11/2009 | Bennett ............................ 707/5 |
| 2009/0287657 A1* | 11/2009 | Bennett ............................ 707/3 |
| 2010/0174703 A1 | 7/2010 | Dandekar et al. |
| 2010/0228718 A1* | 9/2010 | Chen ............................ 707/709 |
| 2010/0287170 A1 | 11/2010 | Liu et al. |

\* cited by examiner

SYSTEM AND METHOD FOR NETWORK OBJECT CREATION AND IMPROVED SEARCH RESULT REPORTING

CROSS-REFERENCE TO RELATED APPLICATIONS

The present application claims priority from U.S. Provisional Patent Application No. 61/272,550, filed Oct. 5, 2009, from U.S. Provisional Patent Application No. 61/272,972, filed Nov. 27, 2009, from Provisional Patent Application No. 61/288,804, filed Dec. 21, 2009, from Provisional Patent Application No. 61/342,870, filed Apr. 19, 2010, from Provisional Patent Application No. 61/282,942, filed Apr. 27, 2010, from Provisional Patent Application No. 61/344,028, filed May 10, 2010 and from Provisional Patent Application No. 61/272,685, filed Oct. 21, 2009, which applications are expressly incorporated by reference herein for all purposes.

BACKGROUND OF THE INVENTION

1. Field of the Invention

The present invention relates generally to data transfer between computer resources communicating by means of a network.

2. Description of Related Art

All of the publications, patents and patent applications cited within this application are herein incorporated by reference in their entirety to the same extent as if the disclosure of each individual publication, patent application or patent was specifically and individually indicated to be incorporated by reference in its entirety.

In recent years the popularity of computers, and the communication networks established between these computers, have increased dramatically. Such communications networks allow computer users, either in a business, government or personal setting, to communicate with each other, either through a centralized communication point, through a plurality of distributed and redundant communication points, or directly. This allows exchange of information between the computers on the communication network, using a common communication protocol between them. It is common for corporations or business to establish a common communications network between their computers, otherwise referred to as "intranets", in which the communication network has limited or no access to unauthorized persons and/or computers. It is common for intranets to be protected by security systems, such as firewalls, which prevent access by unauthorized users of the communications network, the computers communicating through it, and the information contained within these computers.

The term "Internet" has been adopted to describe the publicly available network which has nearly worldwide coverage, and to which most personal computers have access. The pervasive nature of the Internet, combined with the lower cost and increased performance of personal computers, has led to it being a popular source of information. Systems are available which provide an individual with the ability to search for information or resources within the Internet. By way of non-limiting example, systems exist which allow a user to search for information stored on other Internet computers (servers), thus providing generalized access to these resources. Unfortunately, when an individual is searching for specific information, the resource on the Internet may not provide the specific information desired by the individual, or else it may provide certain information in an undesired context. The individual may then continue searching, or else use an alternate system to perform the required searching activities. In general, these searching systems provide minimal ability for a user to provide feedback as to the success of the search, or ways for the user to refine future searches. Generally, the user establishes a series of search terms to initiate a search, and upon failure of the search results to provide the user with what he is looking for, the user modifies or adds further search terms in an effort to increase the chance of success on the next search. Alternatively, the user may switch to an alternate search system and attempt to obtain a successful search result using that second system.

Computers communicate within a network using a common set of standards for exchanging data. One common example is the Transmission Control Protocol/Internet Protocol (TCP/IP) suite. To initiate communications within the communication network, a user (client) may contact another computer on the network (server) and request information or a resource. This is facilitated by various software and hardware systems generally available. A user can access resources within the Internet by being directed through software (e.g., by clicking a hyperlink), by entering a Universal Resource Locator (URL), etc.

A popular protocol for organizing and sharing information on the Internet via the client/server model is known as the HyperText Transfer Protocol (HTTP), and is more commonly referred to in a general sense as the World Wide Web (the web). Generally, the web links information by associating items of interest through the use of HyperText Markup Language (HTML) files, which reside on servers and usually are transferred to clients via HTTP. A user of the web may traverse it by receiving and viewing an HTML file (or just an image, video, etc.), which may contain within it information or embedded images, but which also may contain information on how to acquire further resources from the web, by, for example, incorporating URLs within the file. This information may be displayed to a user as a combination of text and media (for example images, sound, video) and generally is referred to as a "page" or "web page." Generally, the user uses a client, called a web browser, to interact with the web and the various files found on it (e.g., HTML, audio and video files, etc.).

No central authority exists for cataloguing the hundreds of millions of network resources, such as HTML pages, files or media available within an intranet or the Internet. In general though, there are two approaches taken for finding information or resources of interest within a network: 1) a directory hierarchy and 2) a search engine.

Within a directory hierarchy a web page may be analyzed and categorized, allowing users to scan through various categories, and associated subcategories, to identify resources of interest. Alternatively, a search engine may provide a dataset of terms and phrases (keywords) upon which a user may query, and may return a listing of web resources associated with the keywords. Many such search engines are known in the art, with examples including, but not limited to, Google®, Yahoo® and Alta Vista®.

A search engine generally includes two main parts: an index searcher and an index generator. An index searcher may include a database of indexing keywords of web pages and logic for searching the database. An index generator may include a "spider" for gathering web pages and an "indexer" for generating an index into those pages. Typically, a search engine works by sending out the spider to fetch web pages (by, for example, following the various links that exist on an initial set of web pages). The indexer may then read these pages and create an index based on the words contained in each page. Search engines typically use a proprietary algorithm to create their indices such that, ideally, only meaningful results are returned for each query.

Provided with a page by a spider, an indexer may parse the document and insert selected keywords into the database with references back to the original location of the source page. How this is accomplished depends on the indexer. Some indexers index the titles of the web pages or just the first few paragraphs. Some parse the entire contents and index all words. Some parse available meta-tags or other special hidden tags. Meta-tags are special HTML tags that are meant to provide information about a web page. Unlike normal HTML tags, meta-tags do not affect how the page is displayed. Instead, they provide information such as who created the page, how often it is updated, what the page is about, and which keywords represent the page's content. Many search engines use this information when building their indices.

A common problem for these search engines is that they are, by necessity, automated. As such, the vagaries of human language may result in search results that are not always relevant to the query. For example, searching upon the keywords of "Miami" and "dolphins" may return web resources relevant to both a professional football team based in Florida, as well as aquatic mammals on display within the Miami locale. Further, automated search engines generally are poorly constructed to translate the context of web resources into a form searchable by keywords. For example, if searching for information regarding a consumer product, you likely are to receive web resources related to an individual consumer's experience with the product in addition to web resources which enable one to purchase the product. Finally, the relevance of any given web resource returned in response to a search engine query may be based upon a multitude of different factors, such as the number of web pages which refer to a given web resource, the number of times a given keyword appears within the text of a web resource, whether a person or corporation has paid the provider of the search engine to receive more favorable treatment, etc. Therefore significant effort may be required of the user in order to obtain relevant and preferred information via a search engine.

Furthermore, the Internet has voluminous resources and information sources available to it, yet the ability for an individual user to communicate or interact with a web resource generally is limited to that which the creator of the web resource allows. A user is limited in his ability to share or direct persons with whom he knows or shares a common interest; generally, he may either post a reference to the web resource on another web resource accessed by the persons he knows or accessed by those with whom he shares a common interest, or pass the URL to specific users or computers by direct communication, such as by electronic mail.

Many of the computers used today are capable of multitasking, and further provide a variety of user interfaces for controlling various and multiple application programs or system functions simultaneously operating in the computer environment. Personal Computers ("PC") are particularly commonplace, operating with an operating system ("OS") capable of multi-tasking such as Microsoft Windows™ or Apple Computer's MacOS™, or LINUX™. Smaller computing platforms such as held-held computers, personal digital assistants ("PDA"), and advanced wireless telephones may run operating systems capable of multitasking as well.

Users often wish to copy or transfer information or "content" from one program or system function within an OS environment, to another. Using "copy and paste" functions of the application programs and the operating system, the user may select information from a source program (e.g. a Web Browser receiving and displaying information received over an Internet), and "paste" it into the destination program (e.g. a text editing program or document creation program). The copy and paste process is described more fully in U.S. patent application Ser. No. 12/192,391 (20080300859), incorporated by reference, in its entirety, including figures, to the present patent application.

With respect to the accessing of information through a network, for example an Internet, it is a problem in the present state of the art that people who publish content (text, images, audio, etc.) accessible within a network can easily have their content copied without their knowledge or authorization. The very functionality of the copy and paste within an OS make this easy in the digital world. Industry observers sometimes refer to this as 'atomization' of content.

Tools exist to help content publishers find when their content has been copied and posted on other websites or blogs, however, no tools exist to help content owners learn who is using simple cut and paste functions to copy data from their website within their PC, into products such as e-mail, Microsoft Word™, PowerPoint™ or other programs or system functions. It is currently impossible for publishers to monitor this cutting and pasting process because they have no ability to include attribution with the copied content. With monitoring and tracking, it is possible that publishers of content may be better able to monetize the copying and usage of their published content.

BRIEF SUMMARY OF THE INVENTION

The present art has suffered from an inability to utilize the implicit interactions of users to provide a searchable index of network resources, the subset defined by user's implicit interaction with a broader set of network resources; and to use such implicit interactions to increase relevance of network resources subject to user's implicit interactions within search results generated by a search engine.

Certain embodiments of the invention provide a network resource relevance within the search results provided by a search engine comprising execution of a software application operating within the software environment of a viewing program operating on a user computer. In some of these embodiments, the viewing program is capable of viewing resources available in a network (a "network resource"). In some of these embodiments, the software application can identify implicit interaction by a user with a network resource by said user and communicating the interaction, the Uniform Resource Locator (URL) of the network resource and the implicit interaction with content to a second computer. In some of these embodiments, the second computer assigns a unique URL to said content and makes the content generally available to the network thereby creating a user defined object generally available to the network.

The accompanying description illustrates preferred embodiments of the present invention and serves to explain the principles of the present invention

DETAILED DESCRIPTION OF THE INVENTION

Figure 1:
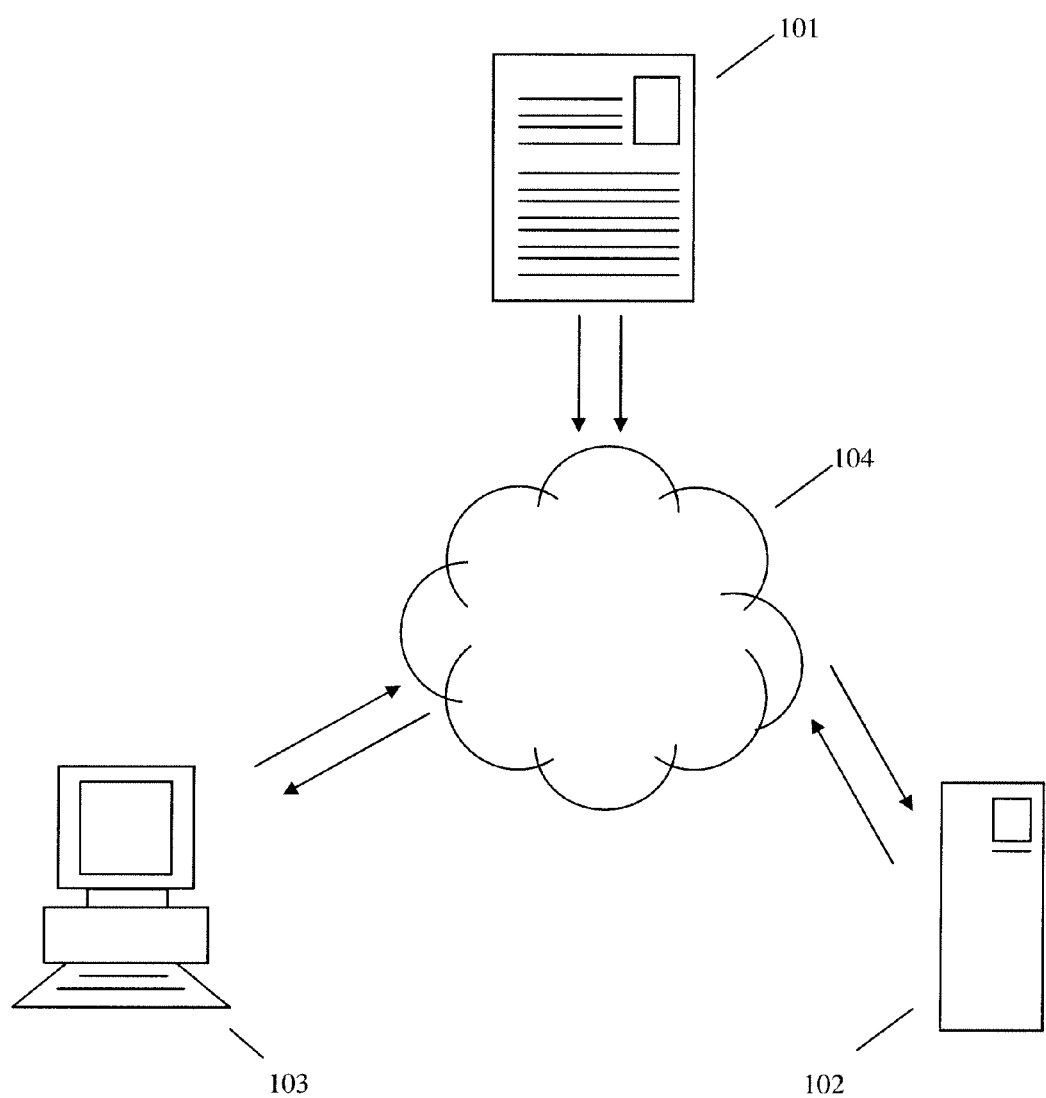
FIG. 1 shows a schematic of the communications flow for a user computer running user interaction detection client software, an IUII server and a network resource (for example, a web page) wherein the user computer is accessing a network resource via a network.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Various search and retrieval techniques have been employed to make the search and retrieval process more deterministic or efficient. For example, in the field of web resource retrieval, a vocabulary for describing web resources, or documents, has been employed, typically according to characteristics of the language itself. Such a system may operate much like an index of a book. Alternatively, a description language may be derived based upon the frequency of occurrence of various words in the language and the juxtaposition statistics of these words (i.e., which words tend to appear together) within the web resource or document. This description language may then used to group various documents and to later retrieve them.

In one fundamental search technique a keyword search is employed that utilizes an index of keywords from an eligible listing. As another example, a network that maintains collections of documents may use an arbitrary set of words to characterize each document in the collection. When a user subsequently requests the retrieval of particular documents, the user may guess at what terms were used in the classification process, or instead may be presented with a fixed list, such as a list of categories. For example, a user might request the system to locate all documents having to do with "balloons". The success of the search in this instance may be directly dependent on how many and which documents had been associated by the search system with the word "balloon". The choice of the words used by the system to characterize the documents is frequently arbitrary and, consequently, the user may experience a somewhat random rate of success at picking the same words to describe the same document.

Keyword searches often produce results that are missing relevant documents or that include irrelevant documents. These errant results can be referred to as errors arising from "semantic mistyping." Since words can be used in variant senses, a document can satisfy a query perfectly well when using a keyword-matching method, but the words in the keyword listing (or even within the network resource itself) may be used in a different sense than those used in the search query from which the search results are generated. Thus, semantic mistyping may lead to a poor user experience by decreasing the availability of relevant documents. Further, since words in languages may have multiple meanings, the possibility of erroneous search results is not insignificant.

A common method to mitigate errors attributable to semantic mistyping is to increase the relative ranking of network resources which are more "popular," with popularity determined through, for example, the frequency of a network resource being selected by a user in prior search results, the frequency of a network resource being selected by the search engine to be included in the search results, the number of references to the network resource present within a network (i.e. number of network resources linking to the particular network resource), etc. In the case where two network resources are otherwise equal with regard to their appropriateness as a search result, the one with the higher rank may appear before (or instead of, etc.) the one with the lower rank. Therefore, the increasing of references to a network resource within the network, wherein the increase of references correlates with user interactions, will increase the relevance of the network resource within search a search result.

This approach to the display of search results to users has a direct impact upon those making network resources available on networks such as the Internet. Many publishers or providers of network resources generate revenue from the display of advertisements in association with the network resource; the quantum of the revenue correlated with the number of users accessing, or viewing, the network resource. Therefore, there is an advantage to a network resource receiving a more preferred placement within an ordered list. Those parties providing search engine services seek to provide relevant search results based upon, amongst other factors, relevance.

Therefore it is generally in the interests of a provider of a network resource to present its network resources in a manner, or to take actions, which will increase the apparent relevance of the network resource when assessed by a search engine. Means to do so are known in the art, such as through the inclusion of in the network resource keywords known to be subject to searches by users of the search engine; either in the displayed text or within hidden metatags. Alternatively, certain search engines, such as Google™, utilize the number of other network resources providing reference to, or "links" to, a network resource as a measure of relevance with respect to certain terms or keywords present within the network resource.

Certain embodiments of the invention provide a method and system for enabling providers of network resources to increase the number of links to a particular resource in association with words, phrases or keywords using implicit interaction of users with the network resource. As an implicit interaction with a network resource by a user is a reasonable proxy for the user finding the element within the network resource, and the network resource in general, as valuable or relevant. As the population of users communicating implicit interactions with network resources increase, so too will the number of references, or links, to the network resource, and by corollary its relevance within certain search engine results. Therefore the present invention will benefit a provider of network resources through increased "links" to their network resource, as well as from identifying words, phrases or keyword within the network resources that users identify as relevant.

In certain embodiments, the outcome of a search of network resources available to a user may be improved by limiting the search to a subset of network resources, the subset defined as those network resources containing elements interacted with by other users. It is contemplated by the present invention that the implicit interactions of users with network resources, for example copying of elements within the network resource, printing of the network resource, selecting elements within a network resource, or copying the URL of the network resource, are activities which identify the network resource or the elements within it as having increased relevance. Therefore, it is advantageous to create a searchable index of network resources, or elements within the network resources, with which a user has had an implicit interaction as such is contemplated herein.

Certain aspects of the invention can be embodied in a variety of programming language and the invention is not limited to a particular class or instance of a programming language, application program environment or operating system. However, for the purposes of clarity, embodiments using the JavaScript™ programming language will be described herein because JavaScript™ is highly prevalent in many commercially available Internet browsers and is well-known in the art.

In one example embodiment of the present invention, software code is communicated proximate in time, or concurrent with, the communication to a second computer of a network resource located on a first computer, by way of non-limiting example a web page. The code contains at least some of the functions contemplated by the present invention, and the network resource comprises digital content. The code is executed proximate in time to the network resource display on the first computer using a program capable of viewing a network resource, such as a web browser, resulting in a user implicit interaction detection program operating on the first computer capable of interfacing with the program capable of viewing a network resource. The user implicit interaction detection program is typically capable of detecting implicit interactions with a network resource within at least the program capable of viewing a network resource. The user implicit interaction detection program reports an implicit user interaction to a third computer in network communication with the second computer. The occurrence of the implicit user interaction may be stored in a computer readable memory for analysis along with implicit user interaction information comprising, for example, what the content interacted with in a network resource was, the URL of the original article, the IP address/geographic location of the user's browser, or other information generally known in the art as useful for identifying relevance of information to a user. The third computer may then direct the generation of a unique URL for the content interacted with by the user, and may generate a searchable index comprising a series of unique objects, each with its own unique URL, and the content, or a subset thereof, interacted with by the user. It is contemplated that subsets of the content interacted with by the user may be limited to certain keywords identified as being particularly relevant for searches, as is known in the art. It is contemplated that images may be indexed by using metatag information contained or referred to in the original network resource in which the image was contained, or alternatively images may be referenced using any text which was interacted with by a user simultaneous with, or proximate in time to, the interaction with the image.

In another example embodiment of the present invention, software code is communicated proximate in time, or concurrent with, the communication to a second computer of a network resource located on a first computer, by way of non-limiting example a web page. The code may contain at least some of the functions contemplated by the present invention and the network resource can comprise digital content. The code is typically executed proximate in time to the network resource display on said first computer using a program capable of viewing a network resource, such as a web browser, resulting in a user implicit interaction detection program operating on the first computer capable of interfacing with the program capable of viewing a network resource. The user implicit interaction detection program may be capable of detecting user implicit interaction with a network resource by a user within at least the program capable of viewing a network resource. The user implicit interaction detection program may report user implicit interactions with a network resource to a third computer in network communication with the second computer. The occurrence of the user implicit interaction may be stored in a computer readable memory for analysis along with implicit user interaction information comprising what the content interacted with in a network resource was, the URL of the original article, the IP address/geographic location of the user browser, or other information generally known in the art as useful for identifying relevance of information to a user. The third computer may then direct the generation a unique URL for the content interacted with by the user including a hyperlink to the originating network resource, and makes the content interacted with by the user generally available to the network for identification by index searcher services. In certain embodiments, each implicit user interaction with a network resource generates a new object within the network, referencing the original network resource, and thereby increasing the number of hyperlink references to the network resource within the network. As the number, or frequency, of links to a network resource within a network is assessed by certain search engines, indexers, or network trawlers, the measure of the relevance of the network resource when reporting search results to a user in response to a query increases.

As used herein an "implicit interaction" of a user with a network resource means an interaction by the user with the network resource not intended to communicate an interest in the content of the network resource, or an element thereof, to a third party. Such interactions are contemplated to include, for example, selection of, saving of, or printing of certain elements forming part of said network resource or copying of the URL of said network resource. As used herein "selection of" with respect to certain elements forming part of a network resource means a user interaction with a network resource such that a portion of said network resource is displayed differently to a user than the remainder. In one example, most programs capable of viewing a network resource, such as internet browsers, allow the selection of text by the user which results in the modification of the display of the text to the user; for example by inverting the colors (i.e. white to black, black to white) of the text and its surrounding area.

Though the present invention is not limited to implementation with a particular network resource user interaction detection system, it is contemplated that, in certain embodiments, the detection system capable of identifying and communicating user interactions with a network resource will communicate the occurrence of, and content of, and network resource subject to a user's implicit interaction as part of the user interaction detection (Implicit User Interaction Information or "IUII") to a computer separate from the user computer, with at least one computer acting as a centralized server (IUII server).

In certain embodiments, the user interaction detection system is based upon an IUII server in network communication with a user computer, whereby the IUII server receives IUII from a client software application running on the user's computer. The system may store the IUII of a user, optionally together with formatting information which may localize the user interaction within the network resource, on an IUII server separate from the web server hosting the network resource.

FIG. 1 shows a schematic of the relationship between user computer 103 containing user interaction detection client software, and IUII server 102, wherein a portion of a network resource 101 (e.g., a web page) is subject to a user interaction by the user on user computer 103. It is explicitly contemplated that a user may interact with a variety of network resources including, for example, application specific documents, proprietary format documents such as Microsoft Word™ or PDF files, video content, audio content and databases. The communication between user computer 101, IUII server 102 and network resource 101 may be through a network 104 (e.g., the Internet). In the user interaction detection system contemplated by the present invention, the IUII server 102 communicates with user computer 103 through a client program within user computer 103, where the client program is in network communication with IUII server 102.

In certain embodiments, user interaction detection software may be resident on the user computer, operating either in conjunction with a program or in an environment within a program capable of accessing and displaying network resources and interpreting and effecting computer-readable instructions, including, but not limited to instructions written in Java®, JavaScript, or programming instruction languages particular to a certain web browser, etc. Installation of the user interaction detection software may be by a user such that the software is normally resident upon the computer and is available to the user upon each use of the software capable of accessing or displaying user network resources (e.g., a web browser).

Figure 2:
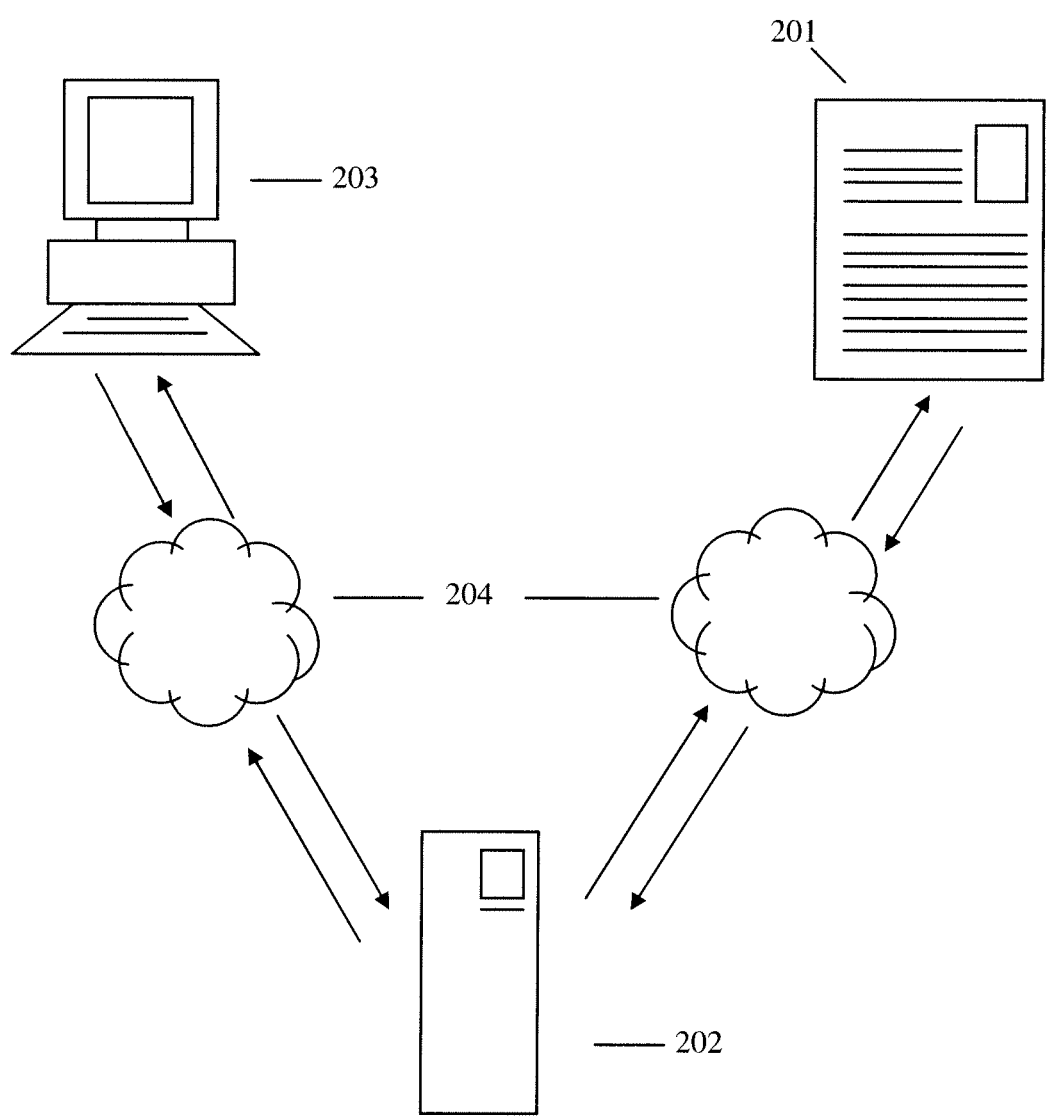
FIG. 2 shows an alternative means of delivering user interaction detection software to the user computer.

In certain embodiments, user interaction detection software may be delivered by means of a network proxy, as depicted in FIG. 2. In this example, the user interaction detection client software may run within the network browser environment (e.g., via JavaScript), and may be loaded on a per-page basis using a proxy server. User computer 203 may seek access to network resource 201, wherein the access to network resource 201 is routed through proxy server 202, with proxy server 202 accessing network resource 201. User computer 203, network resource 201 and proxy server 202 all may be in network communication through means of a common network 204 (e.g., the Internet). Network resource 201 may be obtained by proxy server 202 and passed on to user computer 203, together with computer software code capable of interpretation and operation within the user computer 203. The software code when executed implements the processes and functions described and contemplated as the present invention, specifically the detection of user interactions with a network resource and communication of IUII as more fully described herein.

Generally, proxy server 202 only communicates user interaction detection software code prior to, or following, transmission of the originally requested network resource 201. The user interaction detection software then may be executed within the program operating on user computer 203 that is responsible for the accessing and display of network resource 201.

Figure 3:
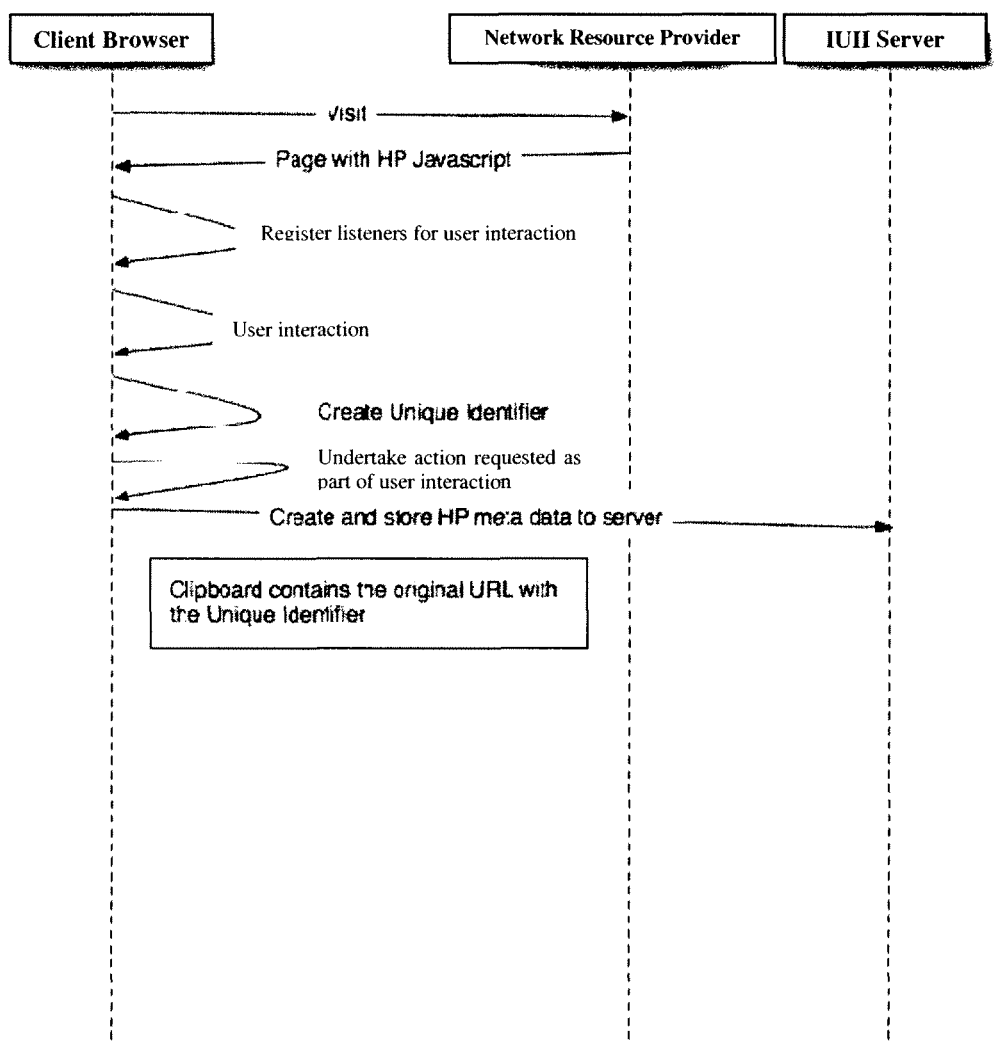
FIG. 3 shows a schematic of the communications flow between the Network Resource Provider (for example, web page) the user client software (Client Browser) and the IUII server upon accessing a network resource.

FIG. 3 illustrates an embodiment of the communication process by which the client software present on the user computer ("Client Browser") may provide information on user interactions to the IUII server. Each network resource may carry with it a unique page identifier, for example a URL, which may be used for creating the unique network object which refers to the originating network resource. As an user interaction with a network resource occurs on the user computer, client software (Client Browser) may communicate the page identifier and elements interacted with to the IUII server, optionally together with a unique identifier code for the user computer, or alternatively for the client software (user ID). The IUII server may then directly, or through communication with a distinct computer in network communication therewith; assign a unique URL to a network accessible object, said object comprising at least a hyperlink to the originating network resource, the elements interacted with by the user. Alternatively the IUII may directly, or through communication with a distinct computer in network communication therewith; create a searchable index of object, each object comprising at least a reference to the originating network resource and the elements interacted with by the user.

Software code capable of being executed on the user computer or within a program on the user computer, such as a client browser, for reporting the occurrence of the user interactions contemplated by the present invention ("HP Javascript") may be provided by the network accessible computer providing the network resource ("Network Resource Provider") as presented in FIG. 3. Alternatively, the HP Javascript may be obtained from a computer other than the Network Resource Provider, including the IUII server or other network accessible computer (not shown) via a direction given by the network resource provider to the Client Browser.

The various systems, modules, etc. described herein may each include a storage component for storing machine-readable instructions for performing the various processes as described and illustrated. The storage component may be any type of machine-readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermo-mechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

System Description

Figure 4:
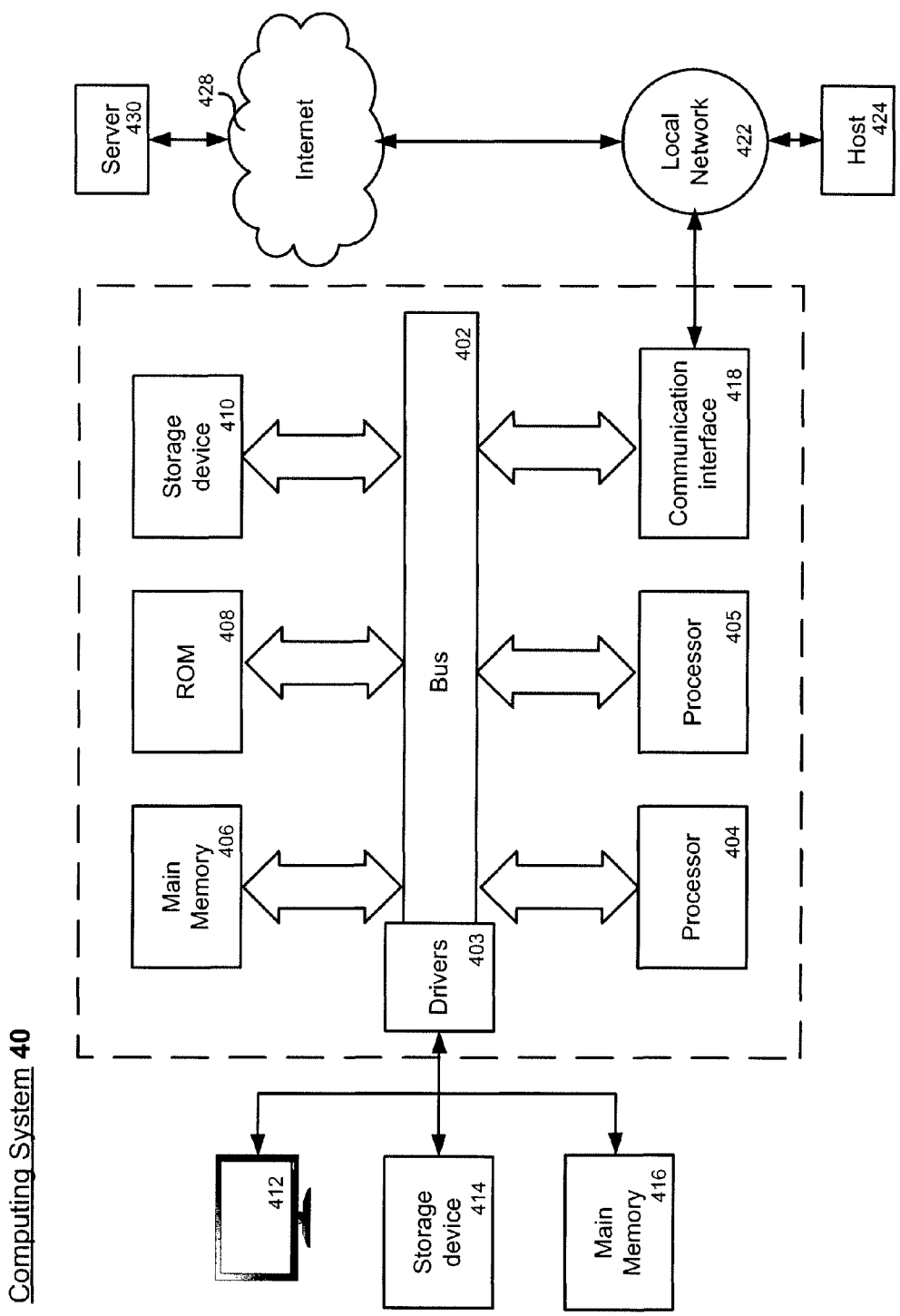
FIG. 4 is a simplified block schematic illustrating a processing system employed in certain embodiments of the invention.

Turning now to FIG. 4, certain embodiments of the invention employ a processing system that includes at least one computing system 400 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a . . . . In one example, computing system 400 comprises a bus 402 and/or other mechanisms for communicating between processors, whether those processors are integral to the computing system 40 (e.g. 404, 405) or located in different, perhaps physically separated computing systems 400. Device drivers 403 may provide output signals used to control internal and external components Computing system 400 also typically comprises memory 406 that may include one or more of random access memory ("RAM"), static memory, cache, flash memory and any other suitable type of storage device that can be coupled to bus 402. Memory 406 can be used for storing instructions and data that can cause one or more of processors 404 and 405 to perform a desired process. Main memory 406 may be used for storing transient and/or temporary data such as variables and intermediate information generated and/or used during execution of the instructions by processor 404 or 405. Computing system 400 also typically comprises non-volatile storage such as read only memory ("ROM") 408, flash memory, memory cards or the like; non-volatile storage may be connected to the bus 402, but may equally be connected using a high-speed universal serial bus (USB), Firewire or other such bus that is coupled to bus 402. Non-volatile storage can be used for storing configuration, and other information, including instructions executed by processors 404 and/or 405. Non-volatile storage may also include mass storage device 410, such as a magnetic disk, optical disk, flash disk that may be directly or indirectly coupled to bus 402 and used for storing instructions to be executed by processors 404 and/or 405, as well as other information.

Computing system 400 may provide an output for a display system 412, such as an LCD flat panel display, including touch panel displays, electroluminescent display, plasma display, cathode ray tube or other display device that can be configured and adapted to receive and display information to a user of computing system 400. Typically, device drivers 403 can include a display driver, graphics adapter and/or other modules that maintain a digital representation of a display and convert the digital representation to a signal for driving a display system 412. Display system 412 may also include logic and software to generate a display from a signal provided by system 400. In that regard, display 412 may be provided as a remote terminal or in a session on a different computing system 400. An input device 414 is generally provided locally or through a remote system and typically provides for alphanumeric input as well as cursor control 416 input, such as a mouse, a trackball, etc. It will be appreciated that input and output can be provided to a wireless device such as a PDA, a tablet computer or other system suitable equipped to display the images and provide user input.

According to one embodiment of the invention, various portions of the herein-described processes may be performed by computing system 400. Processor 404 executes one or more sequences of instructions. For example, such instructions may be stored in main memory 406, having been received from a computer-readable medium such as storage device 410. Execution of the sequences of instructions contained in main memory 406 causes processor 404 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 404 and/or 405, particularly where the instructions are to be executed by processor 404 and/or 405 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 404 and 405 or remotely, typically by use of network connection. Non-volatile storage may be removable from computing system 404, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 400. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 404 and/or 405. For example, the instructions may initially be retrieved from a magnetic disk of a remote computer and transmitted over a network or modem to computing system 400. The instructions may optionally be stored in a different storage or a different part of storage prior to or during execution.

Computing system 400 may include a communication interface 418 that provides two-way data communication over a network 420 that can include a local network 422, a wide area network or some combination of the two. For example, an integrated services digital network (ISDN) may used in combination with a local area network (LAN). In another example, a LAN may include a wireless link. Network link 420 typically provides data communication through one or more networks to other data devices. For example, network link 420 may provide a connection through local network 422 to a host computer 424 or to a wide are network such as the Internet 428. Local network 422 and Internet 428 may both use electrical, electromagnetic or optical signals that carry digital data streams. T Computing system 400 can use one or more networks to send messages and data, including program code and other information. In the Internet example, a server 430 might transmit a requested code for an application program through Internet 428 and may receive in response a downloaded application that provides for the anatomical delineation described in the examples above. The received code may be executed by processor 404 and/or 405.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for determining relevance of a network resource. Some of these embodiments comprise a network resource in communication with a network. In some of these embodiments, the network resource maintains content accessible by a plurality of users of the network. Some of these embodiments comprise an agent provided to a user device operated by the user. In some of these embodiments, the agent is configured to identify an implicit interaction with a portion of the content. In some of these embodiments, the agent is configured to transmit information associated with the implicit interaction to another computing system communicatively connected to the network. In some of these embodiments, the information includes a Uniform Resource Locator (URL) identifying the network resource and the portion of the content. In some of these embodiments, the portion of the content is provided in a user-defined object on the network. In some of these embodiments, the user device includes a browser configured to display the content.

In some of these embodiments, the agent is delivered with the content displayed on the user device. In some of these embodiments, the implicit user interaction includes selecting the portion of the content. In some of these embodiments, the implicit user interaction includes a copy transaction in which the user copies the portion of the content. In some of these embodiments, the information includes a geographic location of the user device. In some of these embodiments, the object is maintained in a networked repository of objects. In some of these embodiments, the repository of objects is indexed according to one or more keywords in the objects. In some of these embodiments, the repository of objects is indexed using metatag information for each object. In some of these embodiments, the metatag information is provided by a network resource that provided the content associated with the each object. In some of these embodiments, the object is one of a plurality of objects generated from implicit interactions with content of the network resource. Some of these embodiments comprise an analyzer that calculates frequency of occurrence of hyperlink references to the network resource in the objects. In some of these embodiments, the frequency of hyperlink references to the network resource is used to calculate relevance of the content.

Certain embodiments of the invention provide an agent provided to a user computing device. In some of these embodiments, the agent comprises software. In some of these embodiments, the agent comprises instructions and data, the instructions, when executed by the user computing device cause the user computing device to perform a process. In some of these embodiments, the process comprises identifying an implicit interaction of a user with content received from a network resource and displayed in a browser of the user computing device. In some of these embodiments, the process comprises copying at least a portion of the content associated with the implicit interaction. In some of these embodiments, the process comprises providing information associated with the implicit interaction to a server. In some of these embodiments, the information includes the copied portion of the content and a URL identifying the network resource and the portion of the content. In some of these embodiments, the server is configured to provide the information associated with the implicit interaction to users of the network. In some of these embodiments, the agent is delivered with the content displayed on the user computing device. In some of these embodiments, the implicit interaction includes at least one of printing a portion of the content, selecting a portion of the content and copying a portion of the content.

Certain embodiments of the invention provide a network resource relevance within the search results provided by a search engine. Some of these embodiments comprise execution of a software application operating within the software environment of a viewing program operating on a user computer. In some of these embodiments, the viewing program is capable of viewing resources available in a network (a "network resource"). In some of these embodiments, the software application can identify implicit interaction by a user with a network resource by said user and communicating the interaction, the Uniform Resource Locator (URL) of the network resource and the implicit interaction with content to a second computer. In some of these embodiments, the second computer assigns a unique URL to said content and makes the content generally available to the network thereby creating a user defined object generally available to the network.

Certain embodiments of the invention provide systems and methods for improving a network resource relevance within the search results of a search engine. Some of these embodiments comprise first and second computers in electronic communication with a network. In some of these embodiments, the network resource resides on the first computer. In some of these embodiments, the network resource is received by the second computer and communicated to a user of the second computer by a viewing program. In some of these embodiments, the network resource causes the viewing program to access and execute software code which identifies an implicit interaction by a user with elements within the network resource. In some of these embodiments, the network resource causes the viewing program to access and execute software code which identifies an implicit interaction by a user with the entirety of the content. In some of these embodiments, the second computer, in response to a user implicit interaction with the network resource, communicates the implicit interaction to the first computer and/or to a third computer. In some of these embodiments, the communication of the implicit interaction includes a Uniform Resource Locator (URL) of the network resource and the content subject to an implicit interaction by a user with the network resource. In some of these embodiments, the content subject to an implicit interaction with the network resource is assigned a unique Uniform Resource Locator and the content made available to the network thereby creating a user defined object generally available to the network.

Certain embodiments of the invention provide systems and methods for creation of a searchable index of network resource content of increased relevance compared to generally available network resources comprising execution of a software application operating within the software environment of a viewing program operating on a user computer. In some of these embodiments, the viewing program is capable of viewing resources available in a network (a "network resource"). In some of these embodiments, the software application identifies implicit interaction by a user with a network resource by the user and communicating the implicit interaction, the Uniform Resource Locator (URL) of the network resource and the content interacted with to a second computer. In some of these embodiments, the second computer assigns a unique URL to the content. In some of these embodiments, the second computer generates a searchable index of network resource content.

Certain embodiments of the invention provide systems and methods for creating an index of network resources subject to an implicit user interaction. Some of these embodiments comprise a first computer in electronic communication with a network. Some of these embodiments comprise a second computer in electronic communication with a network. In some of these embodiments, the network resource resides on the first computer. In some of these embodiments, the network resource is received by the second computer and communicated to a user of the second computer by a viewing program. In some of these embodiments, the user causes the viewing program to identify an implicit interaction by a user with elements within or the entirety of the network resource ("content"). In some of these embodiments, the second computer, in response to an implicit interaction by a user with a network resource communicates the implicit interaction to the first computer or a third computer. In some of these embodiments, the communication of the implicit interaction includes a Uniform Resource Locator (URL) of the network resource and the content interacted with in the network resource. In some of these embodiments, the implicit interaction by a user with the network resource is assigned a unique Uniform Resource Locator while maintaining a link to the URL of the network resource, and form part of a searchable index of network resource content.

Certain embodiments of the invention provide systems and methods for creating a searchable index of network resource content of increased relevance compared to generally available network resources comprising execution of a software application operating within the software environment of a viewing program operating on a user computer. In some of these embodiments, the viewing program is capable of viewing resources available in a network (a "network resource"). In some of these embodiments, the software application identifying implicit interactions of a user with a network resource by the user and communicating the implicit interaction, the Uniform Resource Locator (URL) of the network resource and the content of the implicit interaction with to a second computer. In some of these embodiments, the second computer assigns a unique URL to the content and generating a searchable index of network resource content. In some of these embodiments, accessing of the URL results in a redirection to the network resource. In some of these embodiments, the redirection to the network resource results in the content subject to a user's implicit interaction being modified in its display to a user so as to distinguish it from the remainder of the network resource.

Certain embodiments of the invention provide systems and methods for creating an index of network resources subject to an implicit user interaction. Some of these embodiments comprise a first computer in electronic communication with a network. Some of these embodiments comprise a second computer in electronic communication with a network. In some of these embodiments, the network resource resides on the first computer. In some of these embodiments, the network resource is received by the second computer and communicated to a user of the second computer by a viewing program. In some of these embodiments, the user causes the viewing program to identify an implicit interaction by a user with elements within or the entirety of the network resource ("content"). In some of these embodiments, the second computer, in response to the implicit interaction by a user with a network resource communicates the interaction to the first computer or a third computer. In some of these embodiments, the communication of the implicit interaction includes a Uniform Resource Locator (URL) of the network resource and the content subject to an implicit interaction by a user with the network resource. In some of these embodiments, the content subject to an implicit interaction by a user with in the network resource is assigned a unique Uniform Resource Locator while maintaining a link to the URL of the network resource, and form part of a searchable index of network resource content. In some of these embodiments, accessing of the URL results in a redirection to the network resource results in the redirection to the network resource.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system comprising one or more computing devices for determining relevance of a network resource, the system comprising:

a network resource utilizing at least one computing device for communication with a network, wherein the network resource maintains content accessible to a plurality of users via the network, wherein the plurality of users access the network via a user device operated by each of the plurality of users;

an agent provided to the user devices, the agent configured to identify an implicit interaction with a portion of the content maintained by the network resource and further configured to transmit information associated with the implicit interaction to a server communicatively connected to the network, wherein the information includes a Uniform Resource Locator (URL) including a hyperlink to the network resource, the hyperlink referencing the network resource that maintains the portion of the content with which the implicit interaction was identified, and wherein the information is provided to the server in a user-defined object, the user-defined object maintained in a networked repository of objects at the server and wherein the user-defined object is one of a plurality of objects generated from implicit interactions with content of the network resource; and an analyzer within the server configured to calculate a frequency of occurrence of the hyperlink in the networked repository of objects, the analyzer further configured to measure a relevance of the network resource based on the frequency of occurrence of the hyperlink.

2. The system of claim 1, wherein the user device includes a browser configured to display the content.

3. The system of claim 1, wherein the agent is delivered with the content displayed on the user device.

4. The system of claim 3, wherein the implicit user interaction includes selecting the portion of the content.

5. The system of claim 3, wherein the implicit user interaction includes a copy transaction in which the user copies the portion of the content.

6. The system of claim 3, wherein the information includes a geographic location of the user device.

7. The system of claim 3 wherein the repository of objects is indexed according to one or more keywords in the objects.

8. The system of claim 3 wherein the repository of objects is indexed using metatag information for each object, the metatag information provided by a network resource that provided the content associated with each object.

9. An agent provided to a user computing device including a processor, the agent comprising instructions and data stored in a memory device associated with the user computing device, the instructions, when executed by the user computing device cause the user computing device to:

identify, by the processor, an implicit interaction of a user with content received from a network resource and displayed in a browser of the user computing device;

copy, by the processor, at least a portion of the content associated with the implicit interaction; and provide, by the processor, information associated with the implicit interaction to a server, wherein the information includes the copied portion of the content and a URL including a hyperlink to the network resource, the hyperlink referencing the network resource from which the portion of the content associated with the implicit interaction was received, and wherein the information is provided to the server in a user-defined object, the user-defined object maintained in a networked repository of user-defined objects at the server and wherein the user-defined object is one of a plurality of objects generated from implicit interactions with content of the network resource, and wherein the server is also configured to calculate a frequency of occurrence of the hyperlink in the networked repository of objects and the server is further configured to measure a relevance of the network resource based on the frequency of occurrence of the hyperlink, and wherein the server is configured to provide the information associated with the implicit interaction to users of the network and provide the relevance of the network resource to the users of the network, and wherein the information is maintained in a network and is generated from implicit interactions with content of the network resource.

10. The agent of claim 9, wherein the agent is delivered with the content displayed on the user computing device.

11. The agent of claim 9, wherein the implicit interaction includes at least one of printing a portion of the content, selecting a portion of the content and copying a portion of the content.

12. A method for determining relevance of a network resource, the method comprising:

establishing a network resource utilizing at least one computing device in for communication with a network, wherein the network resource maintains content accessible by a plurality of users of the network, wherein the users access the network via a user device operated by each of the plurality of users;

providing an agent to the user device;

configuring the agent to identify an implicit interaction with a portion of the content maintained by the network resource and further configuring the agent to transmit information associated with the implicit interaction to a server communicatively connected to the network, wherein the information includes a Uniform Resource Locator (URL) including a hyperlink to the network resource, the hyperlink referencing the network resource that maintains the portion of the content with which the implicit interaction was identified, and wherein the portion of the content is provided to the server in a user-defined object, the user-defined object maintained in a networked repository of objects at the server and wherein the user-defined object is one of a plurality of objects generated from implicit interactions with content of the network resource;

calculating, at the server, a frequency of occurrence of the hyperlink in the networked repository of objects; and measuring, at the server, a relevance of the network resource based on the frequency of occurrence of the hyperlink.

13. The method of claim 12, wherein the user device includes a browser configured to display the content and wherein the implicit user interactions include selecting the portion of the content.

14. The method of claim 12, wherein the agent is delivered with the content displayed on the user device.

15. The method of claim 12, wherein the implicit user interactions include a copy transaction in which the user copies the portion of the content.

16. The method of claim 12, wherein the information includes a geographic location of the user device.

* * * * *